United States Patent Office 3,660,493
Patented May 2, 1972

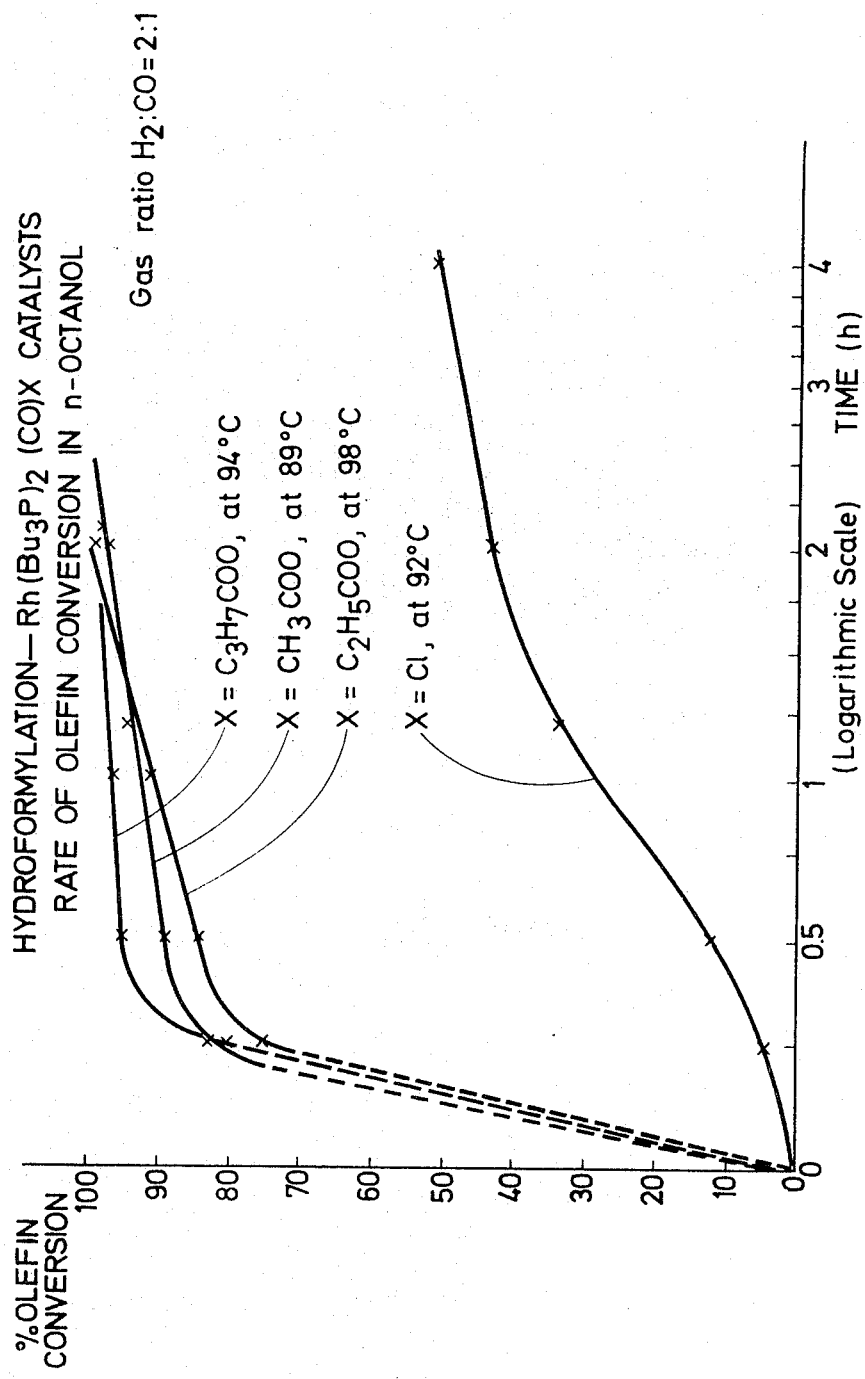

3,660,493
HYDROFORMYLATION PROCESS
Peter Johnson, Chertsey, and Malcolm John Lawrenson, Eastcote, Ruislip, England, assignors to The British Petroleum Company Limited, London, England
Filed Oct. 17, 1967, Ser. No. 675,842
Int. Cl. C07c 45/10
U.S. Cl. 260—604 HF
14 Claims

ABSTRACT OF THE DISCLOSURE

Alcohols and/or aldehydes are formed by reacting olefins with carbon monoxide and hydrogen in the presence of a monovalent rhodium complex having a carboxylate ligand. Trialkyl phosphines are preferred complexing ligands. Alcoholic solvents aid the reaction which may be carried out at atmospheric pressure.

---

This invention concerns a novel process for hydroformylating olefins to give aldheydes and/or alcohols and a novel rhodium complex catalyst.

The oxo process involves reacting an olefin with carbon monoxide and hydrogen using elevated temperature and pressure. The products are aldehydes and/or alcohols. Cobalt compounds, particularly the octacarbonyl are the most commonly used catalysts, but a number of other transition metal compounds have been used.

The square planar rhodium complexes used in our earlier application were all based on inorganic or pseudohalogen salts of monovalent rhodium. We have now discovered most surprisingly that if this inorganic ligand is replaced by an organic carboxylate ligand a catalyst is produced which will produce alcohols as well as aldehydes at much lower temperatures and pressures than was previously possible. Hydroformylation can now be carried out at atmospheric pressure. This means that alcohols can be produced directly, without the need hydrogenate aldehydes in an extra step.

According to one aspect of the present invention there is provided a process for the hydroformylation of olefins to alcohols and/or aldehydes which process comprises hydroformylating an olefin with carbon monoxide and hydrogen at elevated temperature in the presence of a square planar complex of monovalent rhodium containing at least one carboxylate ligand.

The preferred carboxylate ligands are those derived from aliphatic, substituted aliphatic, aromatic or substituted aromatic carboxylic acids, particularly those with less than 20 carbon atoms per molecule and most particularly acetic acid, propionic acid, pivalic acid and isobutyric acids.

The reaction appears to be sensitive to some extent to the inductive effect of the alkyl or aryl group of the carboxylate. The formate and trifluoroacetate for example tend to inhibit the formation of alcohols whereas there is some indication that the pivalate gives a slightly higher rate than the acetate.

The propionate is preferred as it performs well and because complexes containing this ligand can be prepared in higher yield.

Normally one of the ligands of the rhodium complex will be a carbonyl group or will be rapidy replaced by a carbonyl group under the reaction conditions.

The remaining ligands should stabilise the rhodium in its low valency state as strongly as possible by ligand field bonding by π bonding, or both.

The complexing ligands suitable are those containing an atom of a Group Vb or VIb element which has a single pair of electrons available for donation especially phosphorus, nitrogen, arsenic or antimony.

More particularly the ligands may be trialkylphosphines, triaryl phosphines, trialkyl or triaryl arsines or stibines, pyridines or amines such as pyridine, 2,2'-dipyridyl, 2-methyl pyridine, aniline, p-toluidine or ethylene diamine.

The preferred ligands are trialkyl phosphines and particularly triethyl phosphine, tri n-propyl phosphine and tri n-butyl phosphine.

Thus the preferred catalysts are of the formula

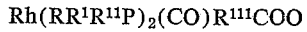

where R, $R^1$, $R^{11}$ and $R^{111}$ may be an y alkyl or aryl groups any number of which may be identical but where preferably R, $R^1$ and $R^{11}$ are alkyl groups having less than 20 carbon atoms per molecule and where $R^{111}$ is $C_2H_5$.

When a carboxylate ligand is present a catalytic quantity of a carboxylic acid aids stability on recycle. This acid is preferably the one corresponding to the carboxylate ligand of the catalyst, but may be any other acid whose carboxylate ion will form a catalyst suitable for this invention. Suitable feeds are olefins having between 2 and 20 carbon atoms per molecule and particularly propylene, hexenes, and heptenes. The double bond is preferably terminal, but may be internal.

The catalyst may be introduced dissolevd in a suitable solvent or in the food or recycled product. The solvent may be a saturated or aromatic hydrocarbon. Normal paraffins such as n-hexane, n-heptane and n-octane are suitable.

We have now discovered that the use of an alcoholic solvent for reaction gives a marked increase in the rate of the reaction. This favours the formation of alcohols in better yields and under milder conditions. Any aromatic or aliphatic monohydric alcohol may be used but the recycled product alcohol is preferred. This will usually be the highest boiling component of the reaction mixture, which allows for a simple recycle procedure. Otherwise aliphatic monohydric alcohols having between 4 and 20 carbon atoms per molecule are suitable. Lower alcohols tend to form acetals with the aldehyde produced by the first step of the reaction.

Alcohols will not be formed if there are more than about 3000 moles of olefin per gram atom of the catalyst or if the pressure drops below about 80 p.s.i.g.

The hydroformylation is suitably carried out at a pressure between 0 and 3000 p.s.i.g., preferably between 300 and 1000 p.s.i.g.

Preferably the temperature is between 60° C. and 200° C., most preferably between 70 and 110° C.

The hydrogen to carbon monoxide ratio in the feed may be between 4:1 to 1:4. However the preferred ratio of 2:1 encourages alcohol formation.

Preferably the catalyst is present as between 1:36 and 1:36000 moles per mole of the olefin feed, most preferably between 1:360 and 1:3600 mols per mole of feed.

According to another aspect of the present invention there is provided a catalyst which is a square planar complex of monovalent rhodium containing at least one carboxylate ligand.

The invention is illustrated but not limited by the following examples.

EXAMPLES

In all the examples of this invention a rhodium bis tri n-alkyl phosphine carbonyl carboxylate catalyst was used which was prepared by passing carbon monoxide over solid rhodium trichloride hydrate maintained at 105+ or −5° C. to yield rhodium carbonyl chloride

The re-crystallised rhodium carbonyl chloride was then shaken in petroleum ether at ambient temperature with a 2-molar proportion of the appropriate sodium carboxylate preferably in its anhydrous form. This forms a bridged carboxylate: $[Rh(CO)_2RCOO]_2$. The bridged carboxylate was then treated with a tri alkyl phosphine or an amine in the solvent for the hydroformylation reaction. The trifluoroacetate was prepared by the reaction:

$$[Rh(CO)_2CH_3COO]_2 + 2CF_3COOH$$
$$= [Rh(CO)_2CF_3COO]_2 + 2CH_3COOH$$

The alkyl phosphine derivatives cannot be crystallised but have a $\nu_{co}$ at about 1970 cm.$^{-1}$ (singlet) in their infra-red spectra.

Examples 1-3

These examples are provided for comparison only and do not show the process of this invention. In each case 0.2 g. of the appropriate catalyst was placed in a 250 ml. stainless steel vessel together with 30 ml. heptane and 15 ml. hexene-1. The autoclave was purged three times with admixed hydrogen and carbon monoxide and pressured with the same gas. The autoclave was then heated with rocking to reaction temperature. The hexene conversion was followed by plotting a graph of pressure/temperature against time. In each case, the autoclave was maintained at reaction temperature for about 3 hours after $P/T$ had ceased to fall due to gas absorption before allowing it to cool, venting the excess gases and removing the product for GLC analysis. The results are set out in Table 1. Run 2 was continued for a much longer period with a 2:1 ratio of hydrogen to carbon monoxide.

Examples 4-6

The catalysts were prepared by bringing together in n-heptane solution the appropriate trialkyl phosphine and μ-diacetato tetracarbonyl-dirhodium in a mole ratio of 2:1 in quantities sufficient to give 0.2 gm. of the catalyst in 30 ml. heptane solvent. This was then charged into a 350 ml. stainless steel autoclave together with 15 ml. of hexene-1 and pressurised with admixed hydrogen and carbon monoxide ($H_2/CO$ molar ratio—2:1) and heated with rocking. The products were extracted and analysed. Details of conditions used and products obtained are given in Table 2.

Examples 7-21

Further runs were performed using the same quantities of olefin, catalyst and solvent as Examples 4-6 but varying the carboxylate ligand and sometimes the phosphine ligand. The results are set out in the accompanying Table 3.

Examples 22-24

Amine catalysts were prepared by adding the amine to a petroleum ether solution of rhodium carbonyl propionate. The reaction is believed to be:

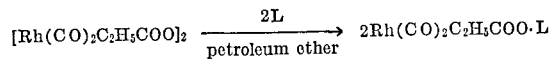

The catalysts were isolated as dark brown solids. Unless otherwise stated conditions were the same as those of Examples 4-6. The results are set out in Table 4.

Examples 25-29

Examples were carried out under the same conditions as Examples 7-21 but the distilled product residue was recycled with fresh feed added. In runs 26R, 27R and 29R a catalytic quantity of a carboxylic acid corresponding to the catalyst ligand was added. The results are set out in Table 5.

Examples 30-36

These examples were carried out using the conditions of runs 4-6 except where stated otherwise. The temperature of reaction was varied however. The results appear in Table 6.

Example 37

It has also been found that phosphite ligands may be present in the catalyst. Using, unless otherwise specified, the conditions of Examples 7-21:

$$Rh[(ETO_3)P]_2(CO)C_2H_5COO$$

gave 100% conversion of olefin in 4 hours at 73° C. and 500-280 p.s.i.g. 2:1 molar ratio $H_2$:CO in n-octanol with a product distribution of 7% hexane, 38% branched aldehyde 54% normal aldehyde and 1% alcohol.

Example 38

Using an alcoholic solvent it is possible to obtain hydroformylation at atmospheric pressure. The following result using the conditions of Examples 7-21 except where specified shows this:

| Catalyst | Moles olefin/ gm. atom Rh | Pressure | Temp. (° C.) | Time (hrs.) | Hexene conv., percent | Product distribution (percent mole olefion free) | | | |
|---|---|---|---|---|---|---|---|---|---|
| | | | | | | Hexane | Branched aldehyde | Normal aldehyde | Alcohol |
| $Rh(Bu_3P)_2(CO)CH_3COO$ | 360 | Atmospheric | 98±2 | 11 | 36 | 4 | 23φ | 68 | 5 |

Runs 1, 2 and 3 are not examples of the process of this invention and are provided for comparison only. Run 2 shows that even under the most suitable conditions, alcohols are not formed with a halide catalyst. Runs 4-6 show the formation of a high proportion of normal alcohol in the absence of normal aldehyde and with only a small proportion of the undesirable branched aldehyde. They demonstrate clearly the superiority of the catalysts of this invention over those where a carboxylate ligand is not present.

In runs 7-21 the carboxylate group is varied widely. Some dependance on the inductive effect of alkyl or aryl radical seems to be shown. With formic acid and trifluoroacetic acid derivatives for example only aldehydes could be formed even under conditions that we have found to be most favourable for alcohol formation viz 2:1 $H_2$:CO molar ratio and an alcoholic solvent, whereas the propionate and trimethyl acetate, with a positive induction effect, give good yields of alcoholic products.

Runs 22-24 using amine ligands are less satisfactory as yields are lower and only aldehydes produced but even these catalysts are still highly active.

Recycling of the product normally causes a fall off in olefin conversion which can be seen in runs 25 and 25R, 28 and 28R. Addition of carboxylic acid can completely eliminate this as in runs 26, 27 and 29.

Increasing the temperature outside the particularly preferred range, while still useable, reduces the ratio of normal to branched product. This is not normally desirable.

Example 37 shows that, although not as good as the trialkyl phosphine complexes, a phosphite complex catalyst gives acceptable yields.

In run 38 atmospheric pressure is used. As far as we are aware this is the first time hydroformylation has been carried out at atmospheric pressure and demonstrates the great efficiency of the catalysts of this invention using an alcoholic solvent.

The greatly increased reaction rate obtained by the catalyst of the invention compared with those where an inorganic salt or pseudo-halide formed the basis of the complex is also clearly brought out in the accompanying graph which shows olefin conversion with respect to time; the reactions using the conditions of Examples 7-21.

TABLE 1

| Run | Catalyst | Total time of run (hrs.) | Temp. (° C.) | Gas ratio, H₂:CO | Pressure (p.s.i.g.) max.-min. | Hexene conv., percent | Product distribution (mole percent olefin free) | | | | |
|---|---|---|---|---|---|---|---|---|---|---|---|
| | | | | | | | Hexane | Branched aldehyde | Normal aldehyde | Branched alcohol | Normal alcohol |
| 1 | [Rh(CO)₂Cl]₂ | 3.5 | 100 | 1:1 | 600-480 | 26 | 13 | 57 | 30 | Nil | Nil |
| 2 | Rh(n-Bu₃P)₂(CO)Cl | 22.5 | 92 | 2:1 | 500 const. | 82 | 1 | 35 | 64 | Nil | Nil |
| 3 | [Rh(CO)₂CH₃COO]₂ | 6.5 | 95 | 1:1 | 520-375 | 61 | 6 | 63 | 31 | Nil | Nil |

TABLE 2

| Run | Catalyst | Total time of run (hrs.) | Temp. (° C.) | Gas ratio, H₂:CO | Pressure (p.s.i.g.) max.-min. | Hexene conv., percent | Product distribution (mole percent olefin free) | | | | |
|---|---|---|---|---|---|---|---|---|---|---|---|
| | | | | | | | Hexane | Branched aldehyde | Normal aldehyde | Branched alcohol | Normal alcohol |
| 4 | Rh(n-Bu₃P)₂(CO)(CH₃COO) | 6 | 95 | 2:1 | 580-300 | 100 | 2 | 7 | Nil | 26 | 65 |
| 5 | Rh(Et₃P)₂(CO)(CH₃COO) | 6 | 90 | 2:1 | 600-325 | 100 | 2 | 6 | Nil | 27 | 65 |
| 6 | Rh(n-Pr₃P)₂(CO)(CH₃COO) | 5.5 | 95 | 2:1 | 580-330 | 99 | 2 | 3 | Nil | 30 | 65 |

TABLE 3.—HYDROFORMYLATION—Rh(n-Bu₃P)₂(CO)R'COO CATALYSTS, EFFECT OF VARYING R'

[Feed: Hexene-1]

| Run No. | Catalyst R'= | Solvent | Total time (hrs.) | Temp. (° C.) | Gas ratio, H₂:CO | Pressure (p.s.i.g.) max.-min. | Product distribution (percent mole) | | | | | |
|---|---|---|---|---|---|---|---|---|---|---|---|---|
| | | | | | | | Hexene | Hexane | Branched aldehyde | Normal aldehyde | Branched alcohol | Normal alcohol |
| 7 | H | Heptane | | 100 | 1:1 | 590-320 | 1 | 2 | 31 | 66 | Nil | Nil |
| 8 | H | Octanol | 2 / 21.5 | 93 | 2:1 | ¹500 | 52 / 14 | Trace / Trace | 14 / 31 | 34 / 55 | Nil / Nil | Nil / Nil |
| 9 | C₂H₅ | do | 2 / 4 | 88 | 2:1 | ¹500 | 7 / 3 | 1 / 2 | 22 / 13 | 19 / 1 | 6 / 18 | 45 / 62 |
| 10 | C₃H₇ | do | 0.5 / 4 | 94 | 2:1 | ¹500 | 7 / Nil | Trace / 2 | 23 / 4 | 50 / Trace | 2 / 24 | 18 / 69 |
| 11 | C₇H₁₅ | do | 2 / 4 | 90 | 2:1 | ¹500 | 7 / 5 | 1 / 2 | 24 / 15 | 7 / 1 | 12 / 22 | 49 / 57 |
| 12 | C₆H₅ ² | Heptane | 4 | 125 | 2:1 | 630-365 | 10 | 2 | 27 | 52 | Trace | 9 |
| 13 | m-CH₃·C₆H₄ | do | 2 | 98 | 1:1 | 590-330 | Nil | 2 | 31 | 62 | Trace | 6 |
| 14 | m-CH₃·C₆H₄ | do | 3 | 98 | 2:1 | 590-520 | 33 | 38 | 9 | 17 | Trace | 2 |
| 15 | p-F·C₆H₄ | do | 5 | 65 | 1:1 | 520-275 | Nil | 1 | 30 | 62 | Trace | 7 |
| 16 | p-F·C₆H₄ | Octane | 9 | 76 | 2:1 | 500-300 | Nil | 1 | 4 | Trace | 25 | 67 |
| 17 | PhCH:CH | Heptane | 1 / 9 | 86 | 2:1 | ¹500 | 1 / Nil | 2 / 2 | 29 / 25 | 67 / 22 | Nil / 7 | 1 / 44 |
| 18 | PhCH:CH | Octanol | 1 / 4 | 88 | 2:1 | ¹500 | 5 / Nil | 3 / 3 | 27 / 21 | 48 / 6 | 1 / 13 | 16 / 57 |
| 19 | CF₃ | do | 4 | 80 | 1:1 | 500-305 | Nil | 2 | 30 | 67 | Nil | 2 |
| 20 | C(CH₃)₃ | do | 2 / 45 | 67 | 2:1 | 550-325 | 19 / 4 | 1 / 1 | 18 / 17 | 31 / 11 | 4 / 12 | 26 / 54 |
| 21 | PhCH:CH² | Heptane | 8 | 95 | 2:1 | 600-340 | Nil | 2 | 3 | Nil | 28 | 67 |

¹ Constant.  ² Indicates Et₃P derivative used instead of Bu₃P.

TABLE 4.—HYDROFORMYLATION—Rh(CO)₂C₂H₅COO.L CATALYSTS

Solvent: n-heptane  
Gas ratio, H₂:CO, 1:1

| Run No. | Catalyst L= | Total time (hrs.) | Temp. (° C.) | Pressure (p.s.i.g.) max.-min. | Product distribution (percent mole) | | | | | |
|---|---|---|---|---|---|---|---|---|---|---|
| | | | | | Hexene | Hexane | Branched aldehyde | Normal aldehyde | Branched alcohol | Normal alcohol |
| 22 | Pyridine | 8 | 75 | 500-362 | 12 | Trace | 45 | 43 | Nil | Nil |
| 23 | α-picoline | 7 | 56 | 600-400 | 10 | 1 | 40 | 49 | Nil | Nil |
| 24 | Aniline | 6 | 65 | 505-355 | 12 | Trace | 48 | 40 | Nil | Nil |

TABLE 5.—HYDROFORMYLATION—Rh(n-Bu₃P)₂(CO)R'COO CATALYSTS, RECYCLE STABILISATION BY ACID

Feed: Hexene-1  
Solvent: n-Octanol  
Gas ratio, H₂:CO, 2:1  
Pressure, p.s.i.g.: 500 constant

| Run Number | 25 | 25R | ¹26 | ¹26R | ¹27 | ¹27R | 28 | 28R | ¹29 | ¹29R |
|---|---|---|---|---|---|---|---|---|---|---|
| Catalyst R'= | CH₃ | CH₃ | CH₃ | CH₃ | CH₃ | CH₃ | C₂H₅ | C₂H₅ | C₂H₅ | C₂H₅ |
| Temperature (° C.) | 89 | 89 | 90 | 90 | 95 | 98 | 88 | 93 | 89 | 89 |
| Olefin conversion to aldehyde after ½ hr | 83 | 52 | 90 | 91 | 87 | 90 | 90 | 27 | 89 | 92 |

¹ Indicates stabilised by the presence of 4 moles of the acid R'COOH/mole catalyst.

25R Indicates recycle of distilled product residue containing catalyst of Run 25 with fresh feed added, similarly for others.

TABLE 6.—HYDROFORMYLATION—Rh(n-Bu₃)P₂(CO)R'COO CATALYSTS, EFFECT OF INCREASING TEMPERATURE

Feed: Hexene-1  
Solvent: n-Heptane  
Gas ratio, H₂:CO, 2:1  
Pressure, max.-min. p.s.i.g.: 680-180

| Run | 30 | 31 | 32 | 33 | 34 | 35 | 36 |
|---|---|---|---|---|---|---|---|
| Catalyst, R'= | CH₃ | CH₃ | CH₃ | PhCH:CH | PhCH:CH | PhCH:CH | PhCH:CH |
| Temperature (° C.) | 79 | 101 | 185 | 77 | 101 | 123 | 177 |
| Ratio of normal:branched products | 2.4 | 1.8 | 0.7 | 2.1 | 2.0 | 1.1 | 0.7 |

What is claimed:

1. A process for the hydroformylation of olefins having from 2 to 20 carbon atoms per molecule which comprises hydroformylating the olefin with carbon monoxide and hydrogen at a temperature between 60° and 200° C. and at a pressure up to 3000 p.s.i.g. in the presence of a square planar complex catalyst of monovalent rhodium having the formula:

$$Rh(RR'R''P)_2(CO)(R'''COO)$$

or $$Rh(RR'R''P)(CO)_2(R'''COO)$$

$$Rh(RR'R''P)(CO)(R'''COO)_2$$

wherein R, R' and R'' are each alkyl groups having less than 20 carbon atoms and said R'''COO is a carboxylate ligand derived from an acid selected from the group consisting of alkanoic acids having from 2 to 20 carbon atoms per molecule, benzoic acids, m-toluic acid, p-fluorobenzoic acid and cinnamic acid, the catalyst being dissolved in a saturated or aromatic hydrocarbon solvent or in the feed or recycled product.

2. A process according to claim 1 where the carboxylate ligand is derived from an alkanoic acid having 2 to 20 carbon atoms per molecule.

3. A process according to claim 1 where the olefin feed is propylene, a hexane, or a heptene.

4. Process according to claim 1 where the solvent is a normal paraffin.

5. Process according to claim 1 where the solvent is n-hexane, n-heptane or n-octane.

6. Process according to claim 1 where the hydroformylation is carried out at a pressure between 300 and 1000 p.s.i.g.

7. A process according to claim 1 where the reaction is carried out at a temperature between 70° and 110° C.

8. Process according to claim 1 where the hydrogen to carbon monoxide ratio in the feed is between 4:1 and 1:4.

9. Process according to claim 7 where the hydrogen to carbon monoxide ratio is 2:1.

10. Process according to claim 1 where the catalyst is present in an amount between 1:36 and 1:36000 moles per mole of the olefin feed.

11. Process according to claim 10 where the catalyst is present in an amount between 1:360 and 1:3600 moles per mole of feed.

12. A process according to claim 1 wherein a catalytic quantity of a carboxylic acid corresponding to the carboxylate ligand of the catalyst is present in the reaction mix.

13. Process according to claim 1 wherein R'''COO is selected from the group consisting acetate, propionate, pivalate and isobutyrate.

14. Process according to claim 1 wherein said $$(RR'R''P)$$

ligand is selected from the group consisting of triethyl phosphine, tri-n-propylphosphine and tri-n-butylphosphine.

References Cited

UNITED STATES PATENTS 3,274,263   9/1966   Greene et al. _____ 260—604 X

OTHER REFERENCES

Jorgensen, Inorganic Complexes, 1963, pp. 94–97, Academic Press Publishers.

Lawson et al., Jour. of the Chem. Soc., 1965, pp. 1900–1907.

Bennett et al., Chemistry and Industry, May 15, 1965, p. 846.

Jardine et al., Chemistry and Industry, March 1965, p. 560.

Osborn et al., Chemical Comm. (London), vol. 2, 1965.

Vallarino, L., Chemical Soc. Journ., 1957, pp. 2287–2292.

LEON ZITVER, Primary Examiner

R. H. LILES, Assistant Examiner

U.S. Cl. X.R.

260—632 HF, 429 R; 252—431 C, 431 P